United States Patent [19]

Heidorn

[11] 3,724,621

[45] Apr. 3, 1973

[54] ELECTROMAGNETIC CLUTCH

[75] Inventor: John H. Heidorn, Dayton, Ohio

[73] Assignee: General Motors Corporation, Detroit, Mich.

[22] Filed: Dec. 27, 1971

[21] Appl. No.: 212,715

[52] U.S. Cl. ............192/84 C, 192/84 C, 192/84 T, 192/105 BA
[51] Int. Cl. ...................F16d 27/10, F16d 43/14
[58] Field of Search ......192/65, 84 C, 84 T, 105 BA, 192/105 R

[56] References Cited

UNITED STATES PATENTS

| 1,863,382 | 6/1932 | Persons | 192/105 BA |
| 2,664,982 | 1/1954 | Orzabal | 192/105 BA |
| 2,919,777 | 1/1960 | Walter | 192/84 C |
| 3,044,594 | 7/1962 | Bernard | 192/84 C |
| 3,082,933 | 3/1963 | Bernard | 192/84 C X |
| 3,368,657 | 2/1968 | Wrensch et al. | 192/84 C |

*Primary Examiner*—Allan D. Herrmann
*Attorney*—Warren E. Finken et al.

[57] ABSTRACT

The clutch illustrated includes electromagnetic engagement means having an integral centrifugal action arrangement for supplementing the magnetic engagement when the coil is energized and serving as the resilient means for retracting the armature plate when the coil is deenergized.

5 Claims, 2 Drawing Figures

PATENTED APR 3 1973  3,724,621

ELECTROMAGNETIC CLUTCH

This invention relates generally to electromagnetic clutches and, more particularly, to electromagnetic clutches including centrifugally-actuated engagement means to supplement the magnetic engagement means.

A general object of the invention is to provide an improved electromagnetic clutch for use with automobile air conditioners.

Another object of the invention is to provide an electromagnetic clutch having improved resistance to slipping at high speed without having to provide for increased magnetic engagement characteristics.

A further object of the invention is to provide an electromagnetic clutch wherein the conventional magnetically-actuated frictional engagement is supplemented by an increased frictional engaging force resulting from an integral simplified centrifugal action arrangement.

A still further object of the invention is to provide such an electromagnetic and centrifugal clutch arrangement wherein the centrifugal action means serves additionally as the resilient means for retracting the armature plate when the electromagnetic coil is deenergized.

Figure 1:
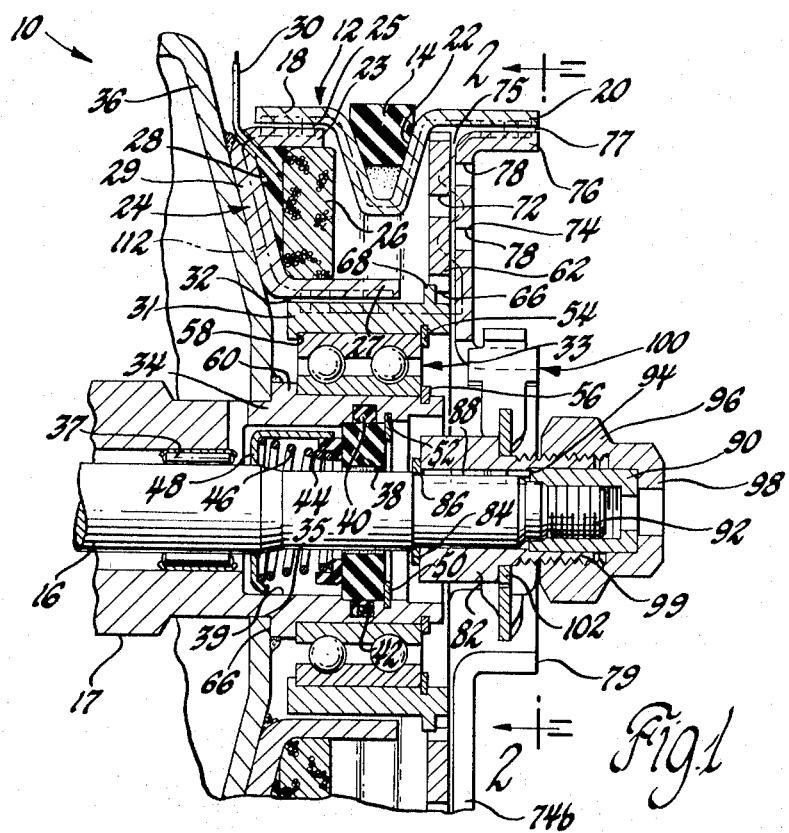
Figure 2:
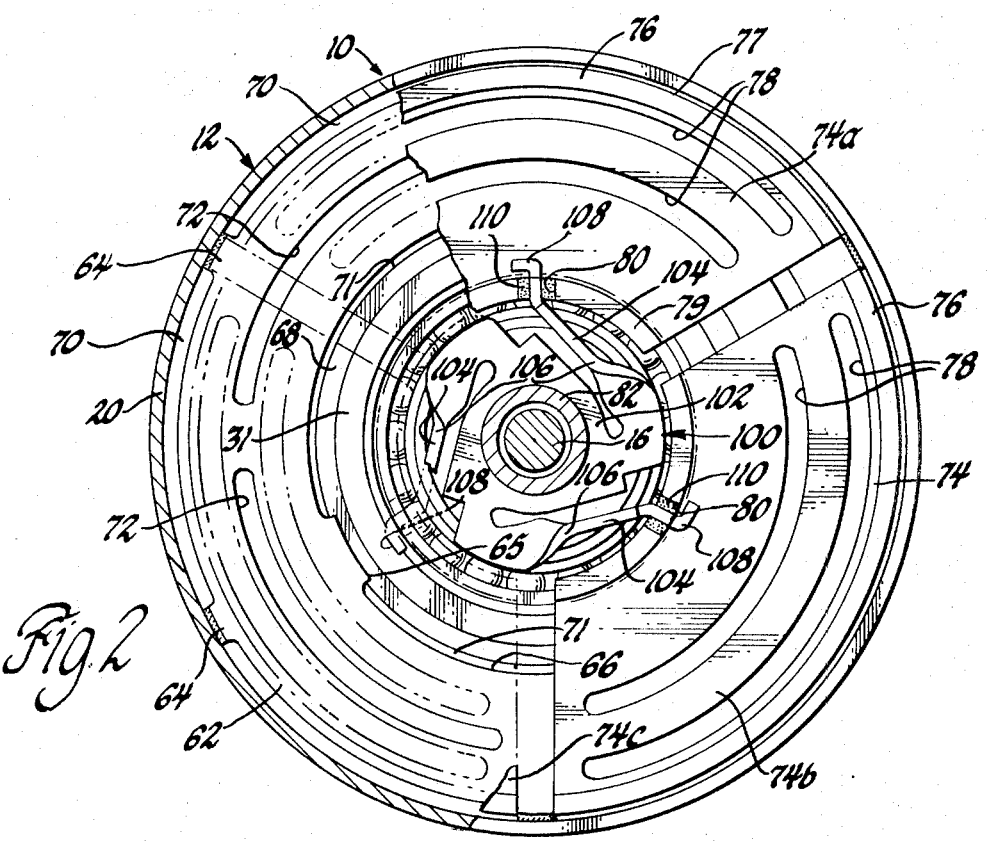

These and other objects and advantages of the invention will be apparent when reference is made to the following description and accompanying drawings, wherein:

FIG. 1 is a fragmentary cross-sectional view of an electromagnetic clutch embodying the invention; and FIG. 2 is an end view in partial cross section taken along the plane of the line 2—2 of FIG. 1, and looking in the direction of the arrows.

Referring now to the drawings in greater detail, FIGS. 1 and 2 illustrate an electromagnetic clutch 10 operable through an input pulley assembly 12 and a drive belt 14 to selectively rotate an output shaft 16 for actuating an engine accessory device, such as an automobile air-conditioning compressor represented generally at 17.

The pulley assembly 12 includes respective first and second cylindrical end portions 18 and 20 extending in opposite axial directions from an intermediate annular pulley groove 22, the latter supporting the drive belt 14. The cylindrical end 18 is mounted around the outer surface of a cylindrical wall 23 of an electromagnetic coil housing or cover member 24, a minimal gap 25 width away therefrom. The cover member 24 encases an electromagnetic coil 26 between the cylindrical wall 23 and a central hub 27 formed on the cover member 24, with a suitable resin 28 intermediate the coil 26 and the adjacent end portion 29 of the cover member 24. An electrical lead 30 extends through the cover member 24 to energize the coil 26.

The hub 27 is mounted around a sleeve member 31, a minimal gap 32 width away therefrom. The sleeve member 31 is rotatably mounted on bearings 33 which, in turn, are mounted around a central sleeve member 34 extending from the compressor 17. The sleeve member 34 extends through and is secured by welding in a central opening 35 formed in a flange-like support member 36 operatively connected to the compressor 17. The end portion 29 of the coil cover member 24 is also secured, as by welding, to the flange member 36. The central sleeve member 34 supports the output shaft 16 by needle bearings 37 at the rear or compressor end thereof and by a stationary seal ring 38 mounted in a counterbore 39 formed in the forward end thereof. An O-ring seal 40 is mounted around the stationary seal ring 38 in a groove 42 formed in the sleeve member 34. A rotating shaft seal 44 is mounted on the output shaft 16 in the counterbore 39 and urged into contact with the stationary seal ring 38 by a spring 46 supported by a spring retainer 48 mounted around the output shaft 16. A retainer ring 50 mounted in an annular groove 52 formed in the counterbore 39 serves as a stop for axially retaining the stationary seal ring 38 within the sleeve member 34.

A pair of retainer rings 54 and 56, mounted on the sleeve members 31 and 34, respectively, adjacent one end of the bearings 33 and shoulders 58 and 60 formed on the sleeve members 31 and 34, respectively, adjacent the other end of the bearings 33, serve to retain the respective cooperating members in axial relationship with the output shaft 16.

A magnetic pole member 62 is secured at a plurality of spaced bosses 64 (FIG. 2) formed around the outer periphery thereof to the inner surface of the second cylindrical end portion 20 of the pulley assembly 12 in any suitable manner, such as welding, and further secured at spaced bosses 65 (FIG. 2) formed around a central opening 66 thereof to the forward end of the sleeve member 31 adjacent a collar 68 formed on the latter. The pole member 62 is thus positioned radially within the cylindrical end portion 20 of the pulley assembly 12 adjacent the pulley groove 22. As a result of the spaced bosses 64, there is formed a plurality of arcuate-shaped annular spaces or passages 70 (FIG. 2) intermediate the cylindrical pulley end portion 20 and the pole member 62. There also results a plurality of arcuate-shaped annular spaces 71 intermediate the pole member 62 and the sleeve member 31 by virtue of the location of the bosses 65. A plurality of equally-spaced arcuate slots 72 (FIG. 2) are formed around an intermediate portion of the pole member 62.

An armature plate 74, formed of three equal-size arcuate segments 74a, 74b, and 74c (FIG. 2), is shown in a deenergized position in FIG. 1. The three-segment armature plate 74 is positioned adjacent the pole member 62, there being a variable-width radially extending gap 75 therebetween. Cylindrical wall segments 76 are formed adjacent the respective outer peripheries of the armature plate segments 74a, 74b, and 74c extending adjacent the inner surface of the second cylindrical end portion 20 of the pulley assembly 12, there being a variable-width annular gap 77 therebetween. Two concentric rows of equally-spaced arcuate slots 78 are formed in each of the armature plate segments 74a, 74b, and 74c, located radially inward and outward of the adjacent arcuate slots 72 formed in the pole member 62.

Cylindrical flange or hub segments 79, each having a radial slot 80 formed therein are formed on the armature plate 74. A hub member 82 is mounted on the first reduced end portion of the output shaft 16, with a spacing ring 84 provided between the inner end of the hub member 82 and a shoulder 86 formed on the output shaft 16. The hub member 82 is keyed to the output shaft 16 by a suitable key 88 and is retained in place by an inner nut 90 threadedly mounted on threads 92 formed on the extended end of the output shaft 16 and abutting at one end thereof against a shoulder 94 formed on an inner surface of the hub member 82. An outer lock nut 96, having a collar 98 formed on an end thereof, is threadedly mounted on threads 99 formed on the outer surface of the hub member 82, the collar 98 abutting against the outermost end face of the inner nut 90.

A centrifugal force-responsive member 100 includes a body portion 102 (FIG. 2) mounted on the hub member 82 for rotation therewith. Three substantially tangentially extending leg segments 104 are formed on the body portion 102, each including an intermediate twisted portion 106 and a bent end portion 108, with the latter extending through the radial slots 80 of the cylindrical flange 79. The end portions 108 are resiliently retained in the slots 80 by molded rubber members or grommets 110.

OPERATION

In operation, the clutch 10 is engaged by the energization of the electromagnetic coil 26 which causes magnetic flux to traverse a path through the adjacent paramagnetic materials, as indicated by the dot-dash line 112 (FIG. 1). More specifically, the path of the flux is from the coil 26 into side wall 29 portion of the cover member 24, thence across the gap 25 into the first cylindrical end portion 18 and around the pulley groove 22 to the second cylindrical end portion 20, then across the adjacent progressively closing annular gap 77 to reach the cylindrical wall segments 76 formed on the armature plate 74, from whence it crosses the radially extending gap 75 to the radial outer portion of the magnetic pole member 62. A plurality of poles result from the spaced relationship of the alternately located arcuate slots 70, 71, 72, and 78 formed in and radially adjacent the pole member 62 and the armature plate 74, the flux alternately crosses the gap 75 to the intermediate portion of the armature plate 74 and thence back across the gap 75 to the intermediate portion of the magnetic pole member 62, and through the gap 75 once again to the radial inner portion of the armature plate 74 and back to the sleeve member 31 from whence the flux crosses the gap 32 to the adjacent hub member 27 to complete the circuit. Some flux bypasses the path just described by crossing into the support bosses 64 and 65. These areas become saturated as a result of excess flux being available from the coil 26. This arrangement provides a strong magnetic attraction which draws the armature plate 74 both axially toward the pole member 62 and radially outwardly toward the pulley cylindrical end portion 20. The resultant axial and radial face-to-face engagement forces cause the member 100, through the leg segments 104, to rotate the output shaft 16 to thus drive the compressor 17.

It should be noted at this point that the leg segments 104 serve as resilient members which are able to "give" while the armature plate 74 moves through the adjacent gap 75 to contact the pole member 62 by virtue of their shapes and the twisted connection with the body portion 102. It may thus be realized that, once the coil 26 is deenergized, nulling the magnetic attraction between the members 62 and 74, the resilient leg segments 104 will return to their original positions reestablishing the predetermined gap 75 width between the armature plate 74 and the pole member 62.

Referring now to FIG. 2, it may be realized that, under the action of centrifugal force and at predetermined pulley 12 speeds, the leg segments 104 will be urged radially outwardly such that the operatively connected cylindrical wall segments 76 are urged toward the cylindrical pulley end portion 20. This is, of course, in addition to the magnetic attraction between the segments 76 and the pulley end portion 20. Thus, it should now be apparent that the centrifugally-actuated engagement process supplements the magnetically-actuated engagement process and that any "slip" between the armature and pole members 74 and 62, respectively, which may tend to occur as a result of increased pulley 12 speed is substantially offset by the resultant increased tendency of the wall segments 76 to more tightly engage the cylindrical end portion 20 of the pulley assembly 12. Hence, there are both radial and annular locations at which frictional engagement is accomplished due to energization of the coil 26, and an annular arrangement whereby centrifugally-actuated frictional engagement occurs.

While but one embodiment of the invention has been shown and described, other modifications thereof are possible.

I claim:

1. A magnetic clutch comprising an input member, an output shaft, a bearing concentric to said output shaft, a cover member mounted adjacent said input member, an electromagnetic coil mounted in said cover member, a first clutch element secured to said input member, a sleeve member secured to said first clutch element and extending axially within said cover member and being rotatably mounted on said bearing, a second clutch element, mounting means for mounting said second clutch element on said output shaft adjacent said first clutch element and providing limited axial and radial movements of said second clutch element relative to said first clutch element and said input member, respectively, upon energization of said electromagnetic coil.

2. The magnetic clutch described in claim 1, wherein said mounting means includes a hub portion mounted on said output shaft, and a plurality of resilient leg segments formed on said hub portion and extending substantially tangentially from said hub portion with respect to said output shaft and operatively connected to said second clutch element, said resilient leg segments serving to permit said second clutch element to move outwardly under the action of centrifugal force to supplement the magnetic attraction between said first and second clutch elements when said coil is energized and serving as the retraction means for retracting said second clutch element when said coil is deenergized.

3. The magnetic clutch described in claim 2, and resilient means interconnecting said resilient leg segments and said second clutch element.

4. A magnetic clutch comprising a housing, an input pulley freely mounted at one end thereof around said housing, an output shaft protruding from said housing and rotatable relative to said housing, an electromagnetic coil mounted in said housing, a pole member secured to said input pulley adjacent the other end thereof, circumferentially spaced armature plate segments operatively connected to said output shaft for rotation therewith, said armature plate segments being located adjacent said pole member a predetermined gap width away therefrom, flange segments formed on the outer periphery of said armature plate segments radially inward of said other end of said input pulley, and centrifugal means operatively connected between said armature plate segments and said output shaft for permitting said armature plate segments to move radially outwardly toward said other end of said input pulley under the action of centrifugal force to supplement the magnetic attraction between said armature plate segments and both of said pole and pulley members when said coil is energized.

5. A magnetic clutch comprising a cover member, an input pulley having first and second cylindrical end portions formed on opposite ends thereof and freely mounted at said first cylindrical end portion thereof around said cover member, an output shaft protruding from said cover member and rotatable relative to said cover member, an electromagnetic coil mounted in said cover member, a pole member, secured to said input pulley adjacent the other end thereof, a sleeve member connected to the radially inner portions of said pole member and extending axially within said cover member, said cover member, input pulley, pole member and sleeve member cooperating to form a clutch housing, a bearing concentric to said output shaft for rotatably supporting said sleeve member, an armature plate including a plurality of circumferentially spaced segments, said armature plate segments being located adjacent said pole member a predetermined gap width away therefrom, a flange portion formed on the outer periphery of each of said armature plate segments radially inwardly of said second cylindrical end portion of said input pulley, a hub member mounted on said output shaft, substantially tangentially extending leg members formed on said hub member and resiliently connected to said armature plate segments for permitting said armature plate segments to move both axially and radially outwardly toward said second cylindrical end portion of said input pulley under the action of centrifugal force to supplement the magnetic attraction between said armature plate segments and both of said pole member and said second cylindrical end portion when said coil is energized and to axially withdraw said armature plate segments from said pole member when said coil is deenergized.

* * * * *